United States Patent
Adams

[15] 3,698,122
[45] Oct. 17, 1972

[54] GOLDEN RATIO PLAYING BLOCKS AND GOLDEN RECTANGLE FRAME

[72] Inventor: Wilbur Henry Adams, 66 East 83rd Street, New York, N.Y. 10028

[22] Filed: March 7, 1968

[21] Appl. No.: 711,255

[52] U.S. Cl..............................46/17, 35/31 G, 46/24
[51] Int. Cl. ..............................................A63h 33/06
[58] Field of Search............46/16, 17, 23, 24, 25, 26; 35/69, 70, 72, 34, 31 G, 22.5

[56] References Cited

UNITED STATES PATENTS

| 243,362 | 6/1881 | Crandall.....................35/71 |
| 298,633 | 5/1884 | Snow.........................46/16 |
| 595,455 | 12/1897 | Glidden.......................46/24 |
| 1,656,199 | 1/1928 | Hodgson.....................35/72 |
| 3,410,002 | 11/1968 | Mulholland et al........35/70 X |

FOREIGN PATENTS OR APPLICATIONS

583,129  12/1946  Great Britain................46/24

Primary Examiner—F. Barry Shay
Attorney—Louis H. Reens

[57] ABSTRACT

A set of playing blocks is described wherein blocks of different sizes are provided with characteristic dimensions that bear a preselected golden ratio relationship with one another. Blocks of successive sizes are related to each other with the Golden Ratio. The Golden Ratio is defined as the ratio between successive numbers in a sequence produced by starting with one and adding the last two numbers to arrive at the next. Blocks of rectangular shape bearing the Golden Ratio to one another are described as well as circular blocks whose diameter varies successively in accordance with the sequence.

2 Claims, 1 Drawing Figure

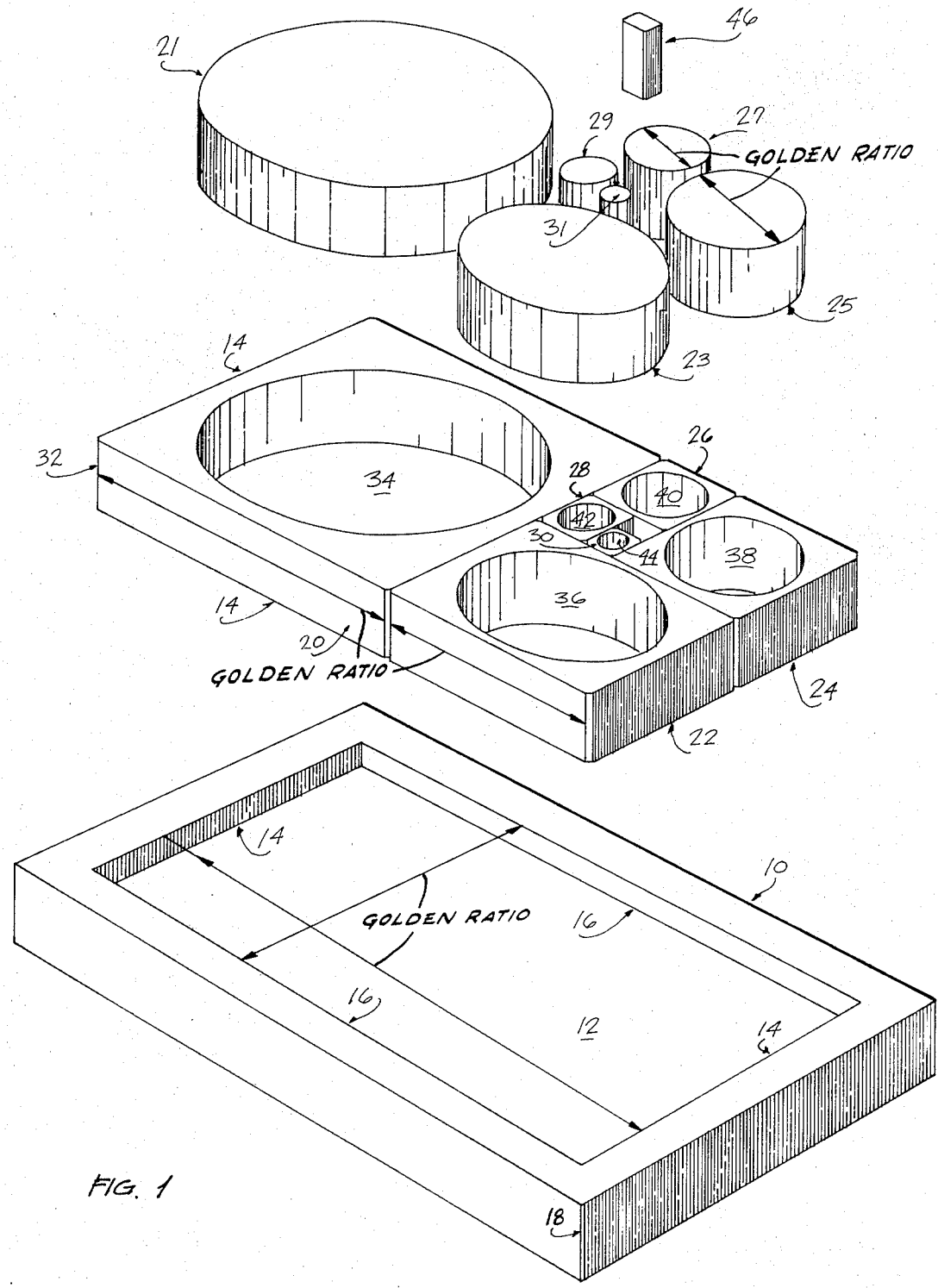

GOLDEN RATIO PLAYING BLOCKS AND GOLDEN RECTANGLE FRAME

BACKGROUND

In the field of playing block toys the common relationship of different sized blocks follows the geometric ratio of $1, 2, 4, 8 \ldots 2^n$. The educational value of such blocks is limited insofar that it induces in the child the concept that things in nature fit snugly and precisely. In fact, however, nature does not present such symmetry uniformly. It acts assymptotically as in the growth of man. In fact animals and flowers often present spirals, e.g., the nautilus shell, the double spiral in the head of the daisy, pine-cone scales as well as the bumps on pineapples.

These naturally occurring spirals bear for some mysterious reason a certain mathematical relationship according to a sequence discovered by Leonardo "Fibonacci" da Pisa. The Fibonacci sequence is produced by starting with 1 and adding the last two numbers to arrive at the next: 1, 1, 2, 3, 5, 8, 13, 21, 34 etc. The daisy's spiral ratio of 21:34 corresponds to two adjacent Fibonacci numbers as well as the pine cone's 5:8 and the pineapple's 8:13, as well as many other plants with spiral growth patterns.

The ratio between any two adjacent Fibonacci numbers after 3 is about 1:1.6. This is also the so-called Golden Ratio. This ratio expressed more precisely as 1:1.618 is particularly true for the Golden Rectangle, a figure whose two sides bear the magic relationship to each other.

SUMMARY OF THE INVENTION

It is therefore an object of this invention to provide a toy having playing blocks bearing the golden ratio to each other.

It is still further an object of this invention to provide playing blocks forming squares of different sizes with adjacent closest sized squares having their edges bear substantially the golden ratio.

It is still further an object of this invention to provide cubical playing blocks bearing the golden ratio.

DESCRIPTION

These objects are accomplished as described hereinafter in relation to the drawings wherein The FIGURE is an exploded view of an embodiment of this invention.

In the FIGURE a wooden frame 10 is provided with an aperture 12 which has the shape of a golden rectangle. Sides 14 of aperture 12 bear a ratio to sides 16 of approximately 1:1.6. The aperture 12 may extend entirely through the frame thickness 18 or the frame 10 may be in the form of a tray with the depth of aperture 12 to be less than the thickness 18.

Playing block 20 has the external shape of a square of uniform thickness 32. The thickness 32 may be the same as the depth of aperture 12, or greater. The sides of square block 20 are substantially the same as side 14 of the aperture 12. In this fashion block 20 represents the largest possible square that will fit into the golden rectangle aperture 12. Block 20 may be solid or made up of several other sections, e.g., half squares which together form the square 20.

Block 20 is further provided with a circular aperture 34. This aperture has a diameter which represents substantially the diagonal of the next smallest block 22.

When the square block 20 is placed inside the rectangle 12, the remaining area is again a golden rectangle but only proportionally smaller. The next adjacent sized square block 22 is then the largest possible square block which if placed within the remaining rectangle in aperture 12 exposes the next smallest golden rectangle. Pursuing this process, other square blocks 24, 26, 28, and 30 can be placed in remaining golden rectangle spaces in aperture 12 until the space becomes so small that no further practically sized blocks are available. This last remaining space is filled with small golden rectangle plug 46.

Each of the aforementioned blocks is further provided with circular apertures 36, 38, 40, 42, and 44 which are sized in diameter on the same basis as aperture 34 in block 20. Discs 21, 23, 25, 27, 29 and 31 are provided to fit into the apertures of the square blocks. If one were to draw a line joining the center of these blocks and discs a spiral pattern would result.

The fully assembled playing block structure thus introduces the concept of an infinite series to the child. The decreasing sized blocks need not be assembled in the aperture 12, but may be mounted in many ways each of which is illustrative of spiral and infinite series concepts.

Furthermore, the structure may be carried out in three dimensions. In such case the frame 10 is expanded in the thickness dimension so that in its final thickness it encompasses an aperture whose depth is as great as the side 14. Block 20 then becomes a cube and the remaining volume of the aperture enclosed by the frame 10 can be filled by smaller cubes having an edge the length of block 22. To fill the volume one needs one cube with edge the size of block 20, one cube of the edge size of block 22, three cubes of the edge size of block 24, etc. The multiple arrangements possible with such three dimensional golden ratio cubes is as fascinating as the two dimensional approach.

As mentioned previously, the basic square blocks such as 20 can be accumulated from smaller blocks. In such case the basic ratio of a fractional block of block 20 to the next largest full-size block will be some sub-multiple of the basic golden ratio of e.g., 1.61/2 (=0.805/br), or 1.61/3 (=0.536/1). Many variations are possible and their utility depend upon the child age group for which the playing block set is designed.

The golden ratio for the golden rectangle is approximately 1.618:1. For playing blocks some variation therefrom can be tolerated to permit loose fitting blocks and allow for the lesser manual dexterity of young children. It is contemplated that those variations from the precise golden rectangle ratio come within the purview of my invention.

The ratios set forth by any two consecutive numbers (after 3) in the Fibonacci sequence is further within the realm of the ratios contemplated for my new playing blocks.

Having thus described my invention and a preferred embodiment thereof I claim:

1. A toy comprising
   an apertured frame, said aperture having a golden rectangle shape, a plurality of square shaped playing blocks, each of said blocks being provided with a characteristic dimension so that blocks of nearest different sizes have the lengths of their sides related to one another by substantially the golden ratio or submultiple thereof, the largest square block being sized commensurate with the largest possible square fittable within the aperture, and with the remaining blocks being similarly sized for remaining open golden rectangle portions of said aperture.

2. A toy comprising a plurality of square shaped playing blocks of uniform thickness, the side of each block being a characteristic dimension such that blocks of nearest different size have their sides related to one another by substantially the golden ratio, said square shaped blocks having centrally located apertures, and circular disc shaped blocks shaped to fit within said apertures, with nearest differently sized circular disc shaped blocks having diameters which relate to one another by the golden ratio and with at least one of said diameters bearing said ratio to a diagonal of at least one of said square blocks.

* * * * *